July 29, 1969  A. C. OUANO  3,458,437
METHOD AND APPARATUS FOR CHROMATOGRAPHIC ANALYSIS
Filed May 27, 1966  3 Sheets-Sheet 1

AUGUSTUS C. OUANO
INVENTOR.

BY Richard A Donnelly, Jr.
ATTORNEY

AUGUSTUS C. OUANO
INVENTOR.

BY Richard A Donnelly, Jr.
ATTORNEY

United States Patent Office 3,458,437
Patented July 29, 1969

3,458,437
METHOD AND APPARATUS FOR CHROMATOGRAPHIC ANALYSIS
Augustus C. Ouano, Lodi, N.J., assignor to Dart Industries, Inc., a corporation of Delaware
Filed May 27, 1966, Ser. No. 553,480
Int. Cl. G01n 31/08
U.S. Cl. 210—31                                    5 Claims

ABSTRACT OF THE DISCLOSURE

Chromatographic analyses of a heterogeneous molecular size system are improved by a method and apparatus for carrying out the method in which one portion of a solution of the system dissolved in a solvent is separated in, e.g., a first of two separation zones containing material having a permeability limit with high resolution for high molecular size components, a stream of the solvent is simultaneously passed through a second separation zone containing material having a permeability limit with high resolution for low molecular size components and through a reference cell in, e.g., a differential refractometer, and the molecular size of components in the effluent from the first zone are detected using the solvent as a reference. The above procedure is repeated with another portion of the solution except that the solution is separated in the second separation zone and detected in the refractometer using the solvent passing through the first zone as a reference.

---

This invention relates to a method for obtaining a chromatographic analysis of heterogeneous molecular size materials and to an apparatus for carrying out this method. More particularly, the invention relates to a method and apparatus for obtaining a molecular size distribution curve for systems of heterogeneous materials.

Systems of particular interest include monomers, dimers, trimers and natural and synthetic polymers up to the highest molecular weight. The invention is particularly applicable to polydispersed systems having a broad range of molecular size such as polymers. Since many physical properties of polymers depend on the relative amounts of the molecular components making up the polymer, the molecular size distribution curve for the polymers is very important in polymer characterization.

Prior art methods for obtaining the molecular size distribution of samples of heterogeneous or polydispersed systems include column elution, fractionation, and coacervation (differential precipitation). However, these methods are very time consuming and expensive and are often inaccurate because the samples degrade during analysis.

Permeation chromatography has circumvented many of the problems associated with these other techniques by reducing the time for obtaining the molecular size distribution from weeks to a few hours. However, prior art permeation chromatographic units contain permeable packing materials, such as porous glass beads or porous cross-linked polymer gels, having a narrow range of permeability limit. The permeability limit for a given packing is the maximum molecular size of the packing can resolve. For example, if the molecular size of the sample exceeds the permeability limit of the packing, the resolution is zero. Good resolution is obtained for a narrow molecular size range sample only if the maximum molecular size of the sample is approximately equal to the permeability limit of the packing used in a given unit. If the molecular size range of a sample is too broad, the prior art units can have good resolution for either the high or low molecular size components, but not both. The permeability limit of the packing in a given unit dictates the resolution one can obtain. If one wishes to obtain good resolution in the prior art chromatographs for a sample having a broad range of molecular size or alternate samples having high and low molecular size, one must obtain a first chromatographic analysis or chromatogram with a packing having one permeability range and then obtain a second chromatogram with a packing having another permeability range. However, after obtaining the first chromatogram, one must shut down and repack the unit with a packing having another permeability range. Thus, it takes over eight times as long to obtain both of the chromatograms as it does to obtain one chromatogram. Because of the great deal of effort required to obtain two chromatograms having high resolution for both ends of the molecular size distribution curve, a compromise is made. The prior are units are usually packed with a gel that gives only fair resolution at either end of the molecular size distribution curve.

An object of this invention is to provide a flexible method and apparatus for obtaining a molecular size distribution curve for heterogeneous materials having a variety of molecular sizes.

Another object of this invention is to provide a method and apparatus for obtaining a molecular size distribution curve of heterogeneous systems having a broad range of molecular size is a fast and efficient manner.

Another object of this invention is to provide an improvement over prior art permeation methods and chromatographs in order to more efficiently determine the molecular size distribution of polymeric systems.

Still another object of this invention is to provide an improvement over prior art permeation methods and chromatographs in order to obtain higher resolution for polydispersed polymeric systems having a broad range of molecular size.

One embodiment of the present invention provides a method for obtaining a chromatographic analysis of a heterogeneous molecular size system which comprises selecting one of two separation zones, one of the zones containing a material having a permeability limit with high resolution for high molecular size components and the other zone containing a material having a permeability limit with high resolution for low molecular size components, the selection being based on the estimated molecular size range of the heterogeneous system, separating in the selected separation zone a solution comprising a sample of the heterogeneous system dissolved in a solvent into components of varying molecular size, passing a stream of the solvent through the separation zone other than the one selected and through a reference cell in a detection zone, and detecting in the detection zone the molecular size of the components in the effluent from the selected separation zone using the solvent as a reference.

Another embodiment of the present invention provides a method for obtaining a chromatographic analysis of the heterogeneous molecular size system which comprises separating in a first column of a separation zone a portion of the solution of the heterogeneous system in the solvent into components of varying molecular size, passing a first stream of the solvent through the second column of the separation zone and through a reference cell in a detection zone, detecting in the detection zone the molecular size of the components in the effluent from the first column using the solvent as a reference, separating in the second column another portion of the solution into components of varying molecular weights, passing a second stream of the solvent through the first column and through the reference cell, and detecting in the detection zones the molecular size of the components in the effluent from the second column. The first column contains a material having a permeability limit with high resolution for the low molecular size components in the hetergeneous system, i.e., in the range of about 1 to $10^5$ angstroms. The second column contains a material having a permeability limit with high resolution for the high molecular weight components in the heterogeneous system, i.e., in the range of about $10^4$ to $10^8$ angstroms.

For a heterogeneous system having a relatively narrow molecular size range, one can use either the first or second separation column depending on whether the system has a low or high molecular size range. For a heterogeneous system having a broad molecular size range, one can first use either the first or second columns and repeat using the other column. This enables one to obtain good resolution at both ends of the molecular size distribution curve. In either case, one uses the column not being used to separate the solution into the various components as the reference column. The solvent from the reference column is passed to the reference cell of the detection zone and is used as the reference in analyzing the heterogeneous system. The material used in the separation columns includes porous glass beads or heteroporous, solvent-swollen polymer networks such as a cross-linked copolymer of divinyl benzene and styrene gels. The permeability limit range of the packing used to analyze most heterogeneous systems is about 10 to $10^6$ angstroms.

Still another embodiment of the present invention provides in a permeation chromatograph having injection means, storage means connected to the injection means, detector means having a sample cell and a reference cell, means for directing therethrough a flow of the solution discussed in the preceding paragraphs and means for directing the flow of the solvent therethrough, the combination of a first separation column, a second separation column, column diversion valve means for diverting the flow of the solution between the first and second columns while simultaneously diverting the flow of the solvent between the second and first columns, respectively, detector diversion valve means for diverting the flow of the solution from the first and second columns through the sample cell of the detector means while simultaneously diverting the flow of the solvent from the second and first columns through the reference cell of the detector means, respectively, and conduit means. The conduit means interconnects the separation columns, valve means, storage means and detector means for flow of the solution from the storage means through the column diversion valve means, the first separation column, the detector diversion valve means and the sample cell and for flow of the solvent through the column diversion valve means, the second separation column, the detector diversion valve, and the reference cell when the column diversion valve means and the detector diversion valve means are in a first position. Similarly, the conduit means interconnects the columns, valve means, storage means and detector means for flow of the solution from the storage means through the column diversion valve means, the second separation column, the detector diversion valve means and the sample cell and for flow of the solvent through the column diversion valve means, the first separation column, the detector diversion valve means and the reference cell when the column diversion valve means and the detector diversion valve means are in a second position.

The present invention is particularly adaptable for determining the distribution of components in polydispersed polymeric systems. Such polymeric systems include all known homopolymers, copolymers, and blends of homopolymers and copolymers which are soluble in a solvent. Without limiting the scope of the present invention, the following list exemplifies those polydispersed systems that can be used in the method and apparatus of the present invention: polyethylene, polypropylene, polybutene, polypentene, polystyrene, polystyrene - acrylonitrile, polyglycols, polycarbonates, polybutadiene, methacrylate, polyvinylchloride, butyl rubbers, latex rubbers, ethylene-propylene rubbers, acrylonitrile - butadiene - styrene, polyurethanes, acrylic resins, cellulose acetate, cellulose propionate, cellulose nitrate and epoxies.

The solvent used in the present invention should have a relatively high boiling point, a low viscosity and a refractive index very different from that of the polydispersed system. In addition, the system must readily dissolve in the solvent at reasonable temperatures, i.e., below 150° C. Although by no means are the solvents in the following list intended to be limiting, they have these properties and have been found to be suitable for the present invention. This list includes aromatics, i.e., trichlorobenzene, orthodichlorobenzene and toluene; ketones, i.e., acetone, methyl ethyl ketones, diethyl ketone, methyl n-propyl ketone, isopropyl methyl ketone, cyclohexanone, acetophenone and benzophenone; and other organic solvents, i.e., tetrahydrofuran, perchloroethylene, chloroform, methylene chloride, ethylene chloride, carbon tetrachloride, meta-cresol and methyl pyrrolidone. The choice of solvent depends on the particular packing used in the separation columns. Each solvent can cause a different amount of swelling to occur in the packing which affects the resolution. Thus, for each solvent used, one must recalibrate the chromatograph.

The temperature used in the chromatograph during the analysis must be sufficient to keep the polydispersed system in solution. This temperature depends on the particular system and solvent used. The temperature ranges from room temperature, i.e., about 20° C., up to 150° C. and higher depending on the stability of the packing. For glass bead packing, the temperature can be above 150° C. and for polymer gels, the temperature should be kept below 150° C., preferably below 135° C. Typical examples of the temperatures used in the chromatograph for various polydispersed solutions are shown in the following table.

| Temp., ° C. | Solute | Solvent |
| --- | --- | --- |
| 130 | Polypropylene | Trichlorobenzene. |
| 130 | Polyethylene | Do. |
| 125 | do | Orthodichlorobenzene. |
| 125 | Polymethylmethacrylate | Do. |
| 125 | Polyvinylchloride | Do. |
| 20 | Polystyrene | Do. |
| 20 | Polyglycols | Do. |
| 20 | Polybutadiene | Do. |
| 20 | Polyacrylonitrile | Do. |
| 20 | Acrylonitrile-butadiene-styrene polymer. | Do. |
| 20 | Polystyrene | Tetrahydrofuran. |

The present invention will be more readily understood and further advantages thereof will be more readily apparent from the following description when read in conjunction with the accompanying figures in which:

FIG. 1A is a view of the combination column and detector diversion valve.

Figure 3:
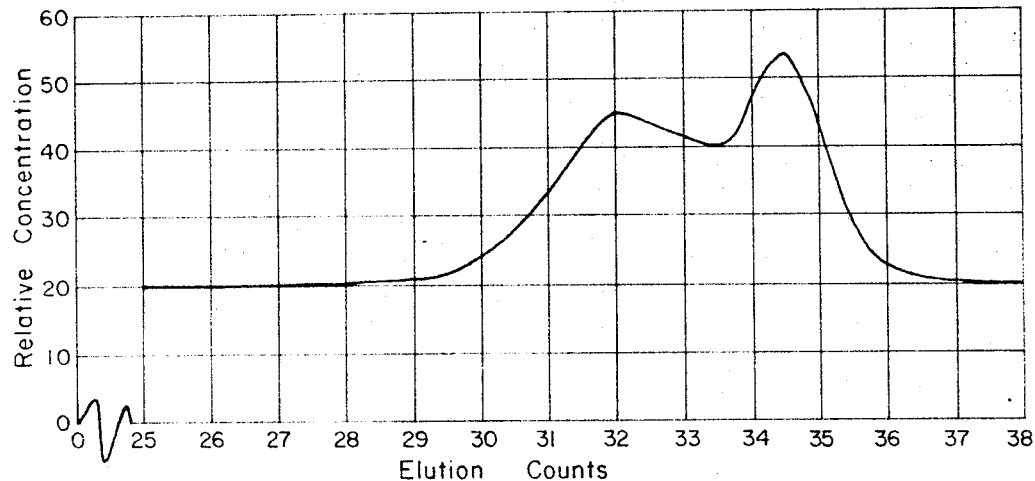

FIG. 3 graphically illustrates a typical chromatogram obtained by the permeation chromatograph of the present invention.

Figure 4:
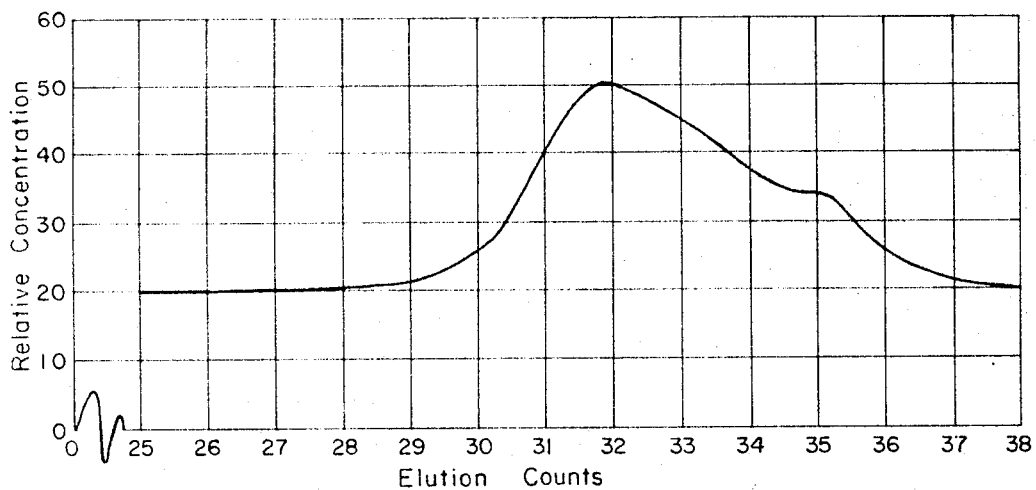

FIG. 4 graphically illustrates a typical chromatogram obtained by prior art gel permeation chromatographs.

Figure 1:
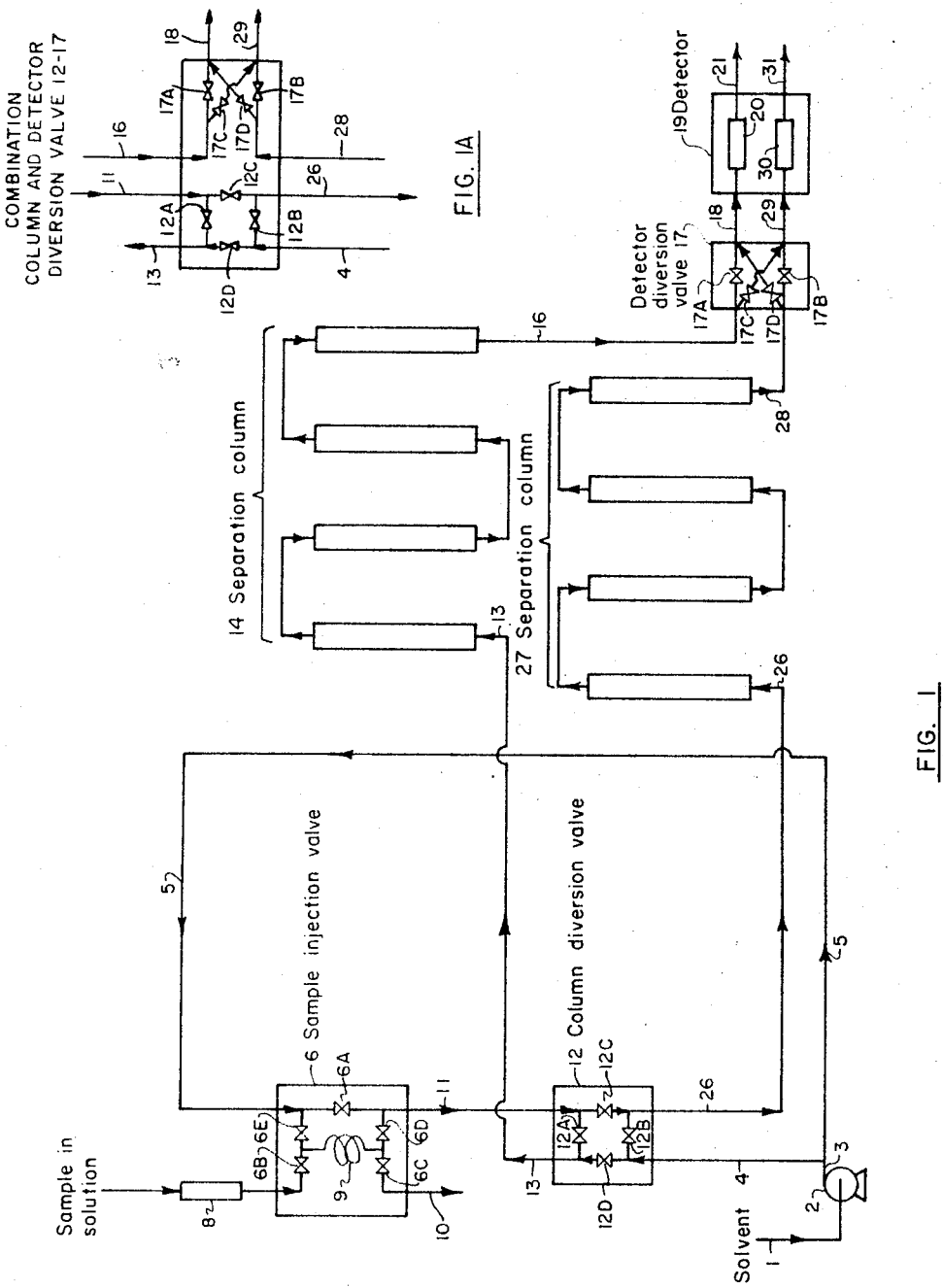
FIG. 1 is a simplified flow diagram of units and flow paths suitable for carrying out the process of the present invention and illustrates a chromatograph of the present invention.

Referring now to FIG. 1, solvent in line 1 passes into a permeation chromatograph of this invention via pump 2. The discharge from pump 2 passes through line 3 and into lines 4 and 5. The solvent is continuously passed through the chromatograph except during the period of sample introduction. The portion of the solvent in line 5 passes through sample injection valve 6 and valve port 6A. The desired amount of a sample of the polydispersed system to be analyzed is dissolved in the solvent.

In a first step, a portion of the resulting solution is introduced into sample injection valve 6 via hypodermic syringe 8. During the introduction, valve ports 6A, 6B and 6C are open and valve ports 6D and 6E are shut. The solution passes through valve port 6B into storage loop 9. The amount of solution introduced into loop 9 must be sufficient to overflow through port 6C and line 10. Sample overflow is required to be sure all air bubbles and other contaminants are completely flushed out of the chromatographic system. Air causes the packing to dry out and the solution to channel through the column resulting in poor resolution. A turn of valve 6, closes valve ports 6A, 6B and 6C and opens 6D and 6E. With valve 6 in this position, the solution can be passed through either of the separation columns. In the first step, the solution passes through line 11 and through column diversion valve 12 in a first position which diverts the sample solution through valve port 12A into line 13. The solution in line 13 passes through separation column 14. Column 14 is packed with, for example, a gel comprising a cross-linked copolymer of divinyl benzene and styrene. Column 14 is shown in FIG. 1 to comprise four separate units in series. The first and second units of column 14 are packed with a gel having a permeability limit of about $10^6$ angstroms. The third and fourth units of column 14 contain a gel having a permeability limit of $10^4$ angstroms. The sample solution is separated into components of varying molecular sizes. Because the high molecular size components pass through the void space and not through the pores, these components rapidly pass through the column. The lower molecular size components permeate more into the pores and pass much more slowly through the column. Column 14 has high resolution for the high molecular size components making up the sample. The effluent from column 14 passes through line 16 and through detector diversion valve 17 in a first position. The effluent passes through valve port 17A, line 18 and detector 19.

Detector 19 can be any suitable device such as a photoelectric colorimeter or refractometer, for measuring relative changes in the concentration of the solution affected by the separation column. A differential refractometer is used in the present invention and comprises a combination of optical, mechanical and electrical components. It measures the difference in the refractive indices between the solution passing through sample cell 20 and the solvent passing through the reference cell. In the present case, the effluent in line 18 passes through sample cell 20. A light beam passes through a lens, not shown, and the solution and is reflected through a series of optical components, not shown, including a light beam deflector and a mirror into two photocells. At the same time the solution passes through the chromatograph, solvent in line 4 passes through valve port 12B of column diversion valve 12, line 26, column 27, line 28, valve port 17B of detector diversion valve 17 and reference cell 30 of detector 19. The same light beam passes through the solvent in reference cell 30 and the same optical components into the two photocells. Changes in the concentration of the solution in sample cell 20 cause corresponding changes in the refractive index of the solution with respect to the solvent in cell 30. These changes in refractive index are picked up by the photocells, converted into an electrical signal, and amplified. The amplified signal drives a motor, not shown, and the light beam deflector which equalizes the amount of light reaching the photocells. Thus, the changes in refractive index corresponding to the relative changes in concentration are automatically recorded and indicated on a strip chart or chromatogram. The sample then passes through cell 20 into a syphon, not shown, which collects 5 ml. samples of solution before automatically dumping them into a sample collector or waste container. As the 5 ml. samples dump, they pass another photocell, not shown, which makes an electric pulse which is recorded on the chromatogram at equal intervals. Each 5 ml. of the solution equals 1 elution count as shown, for example, on the $\chi$-coordinate of FIG. 2. The solvent passing through reference cell 30 is collected and can be discarded or recycled back to pump 2.

In a second step, another portion of the solution passes into storage loop 9 via hypodermic syringe 8 until it overflows through line 10. The solution is passed through valve port 6D, line 11, valve port 12C and line 26. In this step, valve 12 is turned to a second position opening valve ports 12C and 12D and closing ports 12A and 12B. The soluion then passes through separation column 27 where components in the sample are separated according to molecular size. The first unit of column 27 contains a gel having a permeability limit of about $10^4$ angstroms, the second and third units contain a gel having a permeability limit of about $10^3$ angstroms and the fourth unit contains a gel having a permeability limit of about $10^2$ angstroms. Column 27 has a high resolution for the low molecular weight components in the solution. The effluent from column 27 passes through line 28 and detector diversion valve 17. A turn of valve 17 to the second position closes valve ports 17A and 17B and opens ports 17C and 17D. Preferably, column diversion valve 12 and detector diversion valve 17 are combined into one eight port valve, which is illustrated in FIG. 1A and designated as combination column and detector diversion valve 12–17. In the first position of combination valve 12–17, valve ports 12A, 12B, 17A and 17B are open and 12C, 12D, 17C and 17D are shut. In the second position, 12C, 12D, 17C and 17D are open and 12A, 12B, 17A and 17B are shut. The effluent from column 27 then passes through line 18 and sample cell 20. In the second step, the solvent passes through line 4, valve port 12D, line 13, separation column 14, line 16, valve port 17C, line 29 and reference cell 30. The solution is analyzed using the solvent as a reference in the same manner as that described in the above paragraphs. By operating the chromatograph in this manner, one is able to obtain a complete molecular size distribution curve for a sample having a broad range of molecular size with high resolution for both ends of the curve.

The separation columns used in the permeation chromatograph of this invention can comprise one or more units in series depending on the height of gel desired. The height is proportional to the resolution that can be obtained in a particular chromatograph. However, the greater the height of gel, the longer it takes to obtain one chromatogram and the higher the cost of the unit and the cost of running the unit. In the chromatograph of this invention, the optimum height for each sepaartion column is 4 feet per unit or 16 feet per column. The total height of the column closely approximates the total height of gel in each column.

Figure 2:
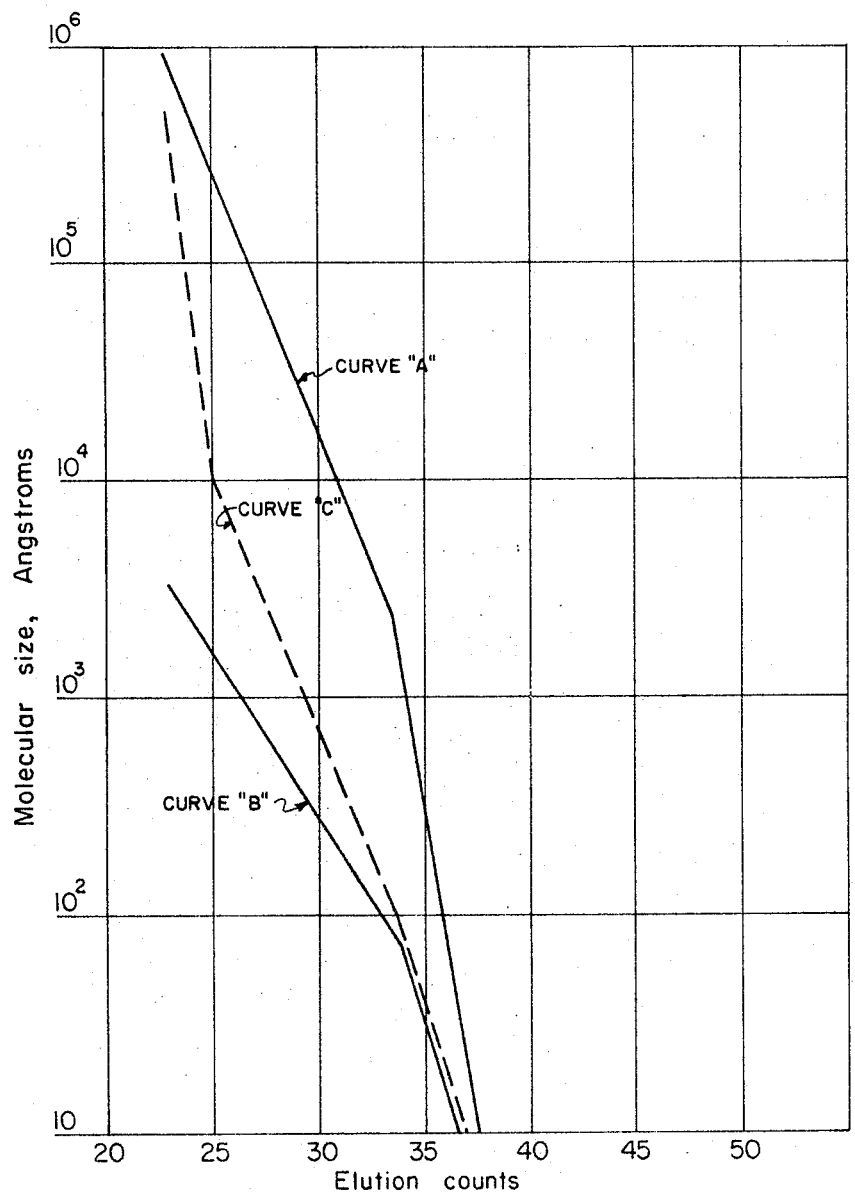
FIG. 2 shows typical calibration curves which are used with a chromatograph to determine the molecular size for a given sample.

FIG. 2 shows typical calibration curves for determining the molecular size of a polydispersed sample in a given solvent and at a given temperature using a given chromatograph. In FIG. 2, the molecular size in angstroms is plotted against elution counts using semi-log coordinates. The polydispersed systems used in calibrating a given permeation column are relatively narrow molecular size polymers having a polydispersity index not greater than 1.10. The polydispersity index equals the weight average of the molecular components in the polymeric system divided by the number average of the components where:

(1) $\quad$ Weight average $= A_w = \dfrac{\sum H_i A_i}{\sum H_i}$ (2) $\quad$ Number average $= A_n = \dfrac{\sum H_i}{\sum H_i/A_i}$ $H_i$ equals the concentration of each molecular component in the polymeric system. $A_i$ equals the molecular size of each component in the system in angstroms. $A_w$ is very sensitive to high and $A_n$ is very sensitive to low molecular size components in the system.

Exemplary of polodispersed systems suitable as calibration standards include polystyrene having a molecular weight range of 3600 to 900,000, polyglycols having a molecular weight range of 400 to 4000, and lower molecular weight glycols, alcohols, ketones and alkanes. Polystyrene is the standard used in calibrating the chromatographic unit of this invention. This standard was made up of 5 components having the following average molecular weights: 860,000, 411,000, 160,000, 19,000 and 3,600. The polystyrene standard is dissolved in trichlorobenzene at 135° C. to form a 1.25 weight percent solution. Care is taken to make sure all of the polystyrene standard is completely dissolved.

Curve "A" of FIG. 2 is a calibration curve for a first separation column packed with a cross-linked copolymer of divinyl benzene and styrene having a high permeability limit. To obtain A, a portion of the standard is introduced into a storage loop, injected into the first separation column, and analyzed in a differential refractometer, as discussed above under the description of FIG. 1. Curve B of FIG. 2 is the corresponding calibration curve for a separation column packed with the same type of gel having a low permeability limit. To obtain B, a second portion of the solution is introduced into a storage loop, injected into a second separation column and analyzed in the refractometer.

One chromatogram is obtained from each of the two sampes in which the elution counts are automatically recorded and plotted against relative concentration for the components making up the standard. The calibration curves A and B are calculated from these chromatograms by plotting the elution counts for each of the peaks in the two chromatograms against molecular size for the components making up the standard on semi-log coordinates. The molecular size of each component is calculated from their known molecular weight and Equation 3:

(3)     Molecular size = molecular weight/Q where Q is the conversion factor for a given standard, i.e., 41 for polystyrene.

The resulting calibration curves are a series of broken straight lines for each molecular size range. The slope of each of the straight lines making up the calibration curves indicates the resolution of a given separation column over that molecular size range. For example, the slop of curve A over the molecular size range of $10^6$ to $10^4$ angstroms is |0.247|.

A and B were compared with a similar calibration curve, C, obtained from a prior art gel permeation chromatograph using the same conditions and the same polystyrene system. The slope of C over the $10^6$ to $10^4$ angstroms range is |0.801|. The slope of the curves are inversely proportional to resolution. Thus, the resolution over the $10^6$ to $10^4$ angstroms range is over 3 times greater for the chromatograph of this invention than for the prior art chromatograph. A similar comparison can be made at the low end of the distribution curve, i.e., over the $10^3$ to $10^2$ angstroms range, using B and C. It can be readily seen that the resolution over the latter range is appreciably better for B obtained by the chromatograph of this invention than for C obtained by prior art chromatograph.

The following example further illustrates the present invention.

EXAMPLE

A 0.5 weight percent solution was prepared by dissolving polyethylene wax in trichlorobenzene. The solution was heated to and maintained at about 135° C. throughout the chromatographic analysis to be sure that the wax solute remained in solution. About 20 ml. of the solution was introduced into storage loop 9 of FIG. 1 by hypodermic syringe 8 until approximately 15 ml. passed through a sample overflow line 10, Approximately 2 ml. of solution remained in loop 9 and was injected through separation column 27 and detector 19 by turning sample injection valve 6, column diversion valve 12, and detector diversion valve 17 to the second position. The chromatogram obtained from the chromatograph is shown in FIG. 3 and was used in preparing a molecular size distribution curve. Specifically, the distribution curve is prepared by plotting the elution counts corresponding to each of the peaks shown on the chromatogram against the corresponding molecular size as indicated on a calibration curve similar to FIG. 2 for the particular solvent and temperature used to obtain FIG. 3. The molecular weight of each of the components of the sample can then be calculated from the molecular size using Equation 3 above for converting molecular size into molecular weight. However, the polydispersity index is all that is usually required to characterize a given polydispersed sample. Therefore, one only needs to obtain the molecular size distribution curve for the system that is to be characterized.

FIG. 4 represents a chromatogram of the same polyethylene wax sample obtained by using the same steps and under the same conditions as in the above paragraph except that a prior art gel permeation chromatograph was used. The separation column used in the prior art chromatograph to separate the solution into the components of varying molecular size was packed with the same height of the same type of gel used in column 27.

FIG. 3 indicates one peak at an elution count of about 32 and a second peak at an elution count of about 34.5. On the other hand, FIG. 4 shows only one of the two peaks at an elution count of about 32. A shoulder of a peak at an elution count of about 35 represents the mere start of the second peak. This indicates that a much higher resolution of the polyethylene wax is obtained from the chromatograph of the present invention than obtained from the prior art chromatograph.

Thus, it has been shown that the method and chromatograph of the present invention enables one to obtain high resolution for a wide variety of heterogeneous systems over the entire molecular size distribution curve. This high resolution is obtained without the necessity of shutting down and repacking the chromatograph with a different packing for the molecular size range desired. For even a relatively narrow molecular size range sample, the present invention can achieve a higher resolution than with prior art methods and in prior art gel permeation chromatographs.

What is claimed is:

1. A method for obtaining a chromatographic analysis of a heterogeneous molecular size system which comprises:
    (a) selecting one of two separation zones, one of said zones containing material having a permeability limit with high resolution for high molecular size components and the other zone containing a material having a permeability limit with high resolution for low molecular size components, the selection being based on the estimated molecular size range of said heterogeneous system,
    (b) separating in the selected separation zone a first portion of a solution comprising a sample of said heterogeneous system dissolved in a solvent into components of varying molecular size,
    (c) passing a stream of said solvent through the separation zone other than the one selected and through a reference cell in a detection zone,
    (d) detecting in said detection zone the molecular size of the components in the effluent from the selected separation zone using the solvent as a reference,
    (e) separating in the separation zone other than the one selected in step (b) a second portion of said solution into components of varying molecular size,
    (f) passing a second stream of said solvent through the separation zone selected in step (b) and through said reference cell, and
    (g) detecting in said detection zone the molecular size of the components in the effluent from the second selected separation zone using the solvent as a reference.

2. The method of claim 1 wherein said heterogeneous system is selected from the group consisting of homopolymers, copolymers, or blends of homopolymers and copolymers.

3. A method for obtaining a chromatographic analysis of a heterogeneous molecular size system having a broad molecular size range dissolved in a solvent which comprises:
  (a) separating in a first column of a separation zone one portion of a solution of said heterogeneous system in said solvent into components of varying molecular size, said first column containing a packing having a permeability limit range of about 1 to $10^5$ angstroms,
  (b) passing a first stream of said solvent through a second column of said separation zone and through a reference cell of a detection zone, said second column containing a packing having a permeability limit range of about $10^4$ to $10^8$ angstroms,
  (c) detecting in said detection zone the molecular size of the components in the effluent from said first column with high resolution for the low molecular size components, using the first solvent stream as a reference,
  (d) separating in said second column another portion of said solution of said heterogeneous system in said separation zone into components of varying molecular size,
  (e) passing a second stream of said solvent through said first column and through said reference cell, and
  (f) detecting in said detection zone the molecular size of the components in the effluent from said second column with high resolution for the high molecular weight components, using the second solvent stream as a reference.

4. In a permeation chromatograph having injection means, storage means connected to said injection means, detector means having a sample cell and a reference cell, means for directing therethrough a flow of a solution comprising a sample of a heterogeneous molecular size system dissolved in a solvent, and means for directing a flow of said solvent therethrough, the combination of:
  (a) a first separation column containing a material having one permeability limit range,
  (b) a second separation column containing a material having another permeability limit range,
  (c) column diversion valve means for diverting the flow of said solution between said first and second columns while simultaneously diverting the flow of said solvent between said second and first columns, respectively,
  (d) detector diversion valve means for diverting the flow of said solution from said first and second columns through the sample cell of said detector means while simultaneously diverting the flow of said solvent from said second and first columns through the reference cell of said detector means, respectively, and
  (e) conduit means interconnecting said separation columns, valve means, storage means, and detector means for flow of said solution from said storage means through said column diversion valve means, said first separation column, said detector diversion valve means and said sample cell and for flow of said solvent through said column diversion valve means, said second separation column, said detector diversion valve means and said reference cell when said column diversion valve means and said detector diversion valve means are in a first position, and for flow of said solution from said storage means through said column diversion valve means, said second separation column, said detector diversion valve means and said sample cell and for flow of said solvent through said column diversion valve means, said first separation column, said detector diversion valve means and said reference cell when said column diversion valve means and said detector diversion valve means are in a second position.

5. The permeation chromatograph of claim 4 wherein said column diversion valve means and said detector diversion valve means are combined into one valve means for diverting the flow of said solution between said first and second columns and from said first and second columns through the sample cell of said detector means while simultaneously diverting the flow of said solvent between said second and first columns and from said second and first columns through said reference cell, respectively.

References Cited

UNITED STATES PATENTS

| 2,972,246 | 2/1961 | Reinecke et al. | 73—23.1 |
| 3,120,749 | 2/1964 | Paglis et al. | 73—23.1 |
| 3,285,701 | 11/1966 | Robertson | 55—67 X |

OTHER REFERENCES

Moore, J. C., "Gel Permeation Chromatography—A New Method for Molecular Weight Distribution of High Polymers," Journal of Polymer Science, part A, vol. 2, pp. 835–843 (1964).

REUBEN FRIEDMAN, Primary Examiner

J. L. DE CESARE, Assistant Examiner

U.S. Cl. X.R.

55—386; 210—198